(12) United States Patent
Hageman et al.

(10) Patent No.: US 12,195,942 B2
(45) Date of Patent: Jan. 14, 2025

(54) WORK CYCLE IDENTIFICATION FOR SCRAPERS AND CORRESPONDING FEATURE AUTOMATION

(71) Applicant: Deere & Company, Moline, IL (US)

(72) Inventors: John M. Hageman, Dubuque, IA (US); Joshua T. Lawson, Woodbury, MN (US); Suraj Amatya, Urbandale, IA (US); Francois Stander, Dubuque, IA (US)

(73) Assignee: Deere &Company, Moline, IL (US)

( * ) Notice: Subject to any disclaimer, the term of this patent is extended or adjusted under 35 U.S.C. 154(b) by 249 days.

(21) Appl. No.: 17/963,487

(22) Filed: Oct. 11, 2022

(65) Prior Publication Data

US 2024/0117593 A1      Apr. 11, 2024

(51) Int. Cl.
*E02F 3/84*   (2006.01)
*E02F 9/26*   (2006.01)
*G05D 1/00*   (2006.01)
*G07C 5/02*   (2006.01)

(52) U.S. Cl.
CPC ............... *E02F 3/841* (2013.01); *E02F 9/26* (2013.01); *G05D 1/021* (2013.01); *G07C 5/02* (2013.01)

(58) Field of Classification Search
None
See application file for complete search history.

(56) References Cited

U.S. PATENT DOCUMENTS

| | | |
|---|---|---|
| 5,493,798 A | 2/1996 | Rocke et al. |
| 6,092,863 A | 7/2000 | Hagenbuch et al. |
| 6,247,538 B1 | 6/2001 | Takeda et al. |
| 7,326,023 B2 | 2/2008 | Hagenbuch |
| 7,934,329 B2 | 5/2011 | Mintah et al. |
| 8,752,372 B2 | 6/2014 | Ramler et al. |
| 8,948,974 B2 | 2/2015 | Montocchio |
| 9,074,546 B2 | 7/2015 | Asami et al. |
| 9,187,879 B2 | 11/2015 | Suk |
| 9,221,659 B2 | 12/2015 | Fukasu et al. |
| 9,342,091 B2 | 5/2016 | Wuisan et al. |

(Continued)

FOREIGN PATENT DOCUMENTS

WO      2012157381 A1      11/2012

*Primary Examiner* — Peter D Nolan
*Assistant Examiner* — Jacob Kent Besteman-Street
(74) *Attorney, Agent, or Firm* — Gary L. Montle; Lucian Wayne Beavers; Patterson Intellectual Property Law, PC

(57) ABSTRACT

A system and method are provided for work cycle tracking for a self-propelled work vehicle having an integrated or drawn/pushed implement, for example comprising a scraper, and a loading container for receiving material worked thereby. First sensors generate data corresponding to operating parameters of the work vehicle, and second sensors generate data corresponding to operating parameters of the implement. Data storage includes, for each of various work states associated with the work cycle, correlations between operating parameters, of the work vehicle and/or implement, and a start or completion of the respective work state. A controller determines a current work state of the various work states associated with the work cycle based on current input data from the first and second sets of sensors, with respect to the stored correlations, and generates one or more output signals based on the determined work state.

18 Claims, 4 Drawing Sheets

(56) References Cited

U.S. PATENT DOCUMENTS

| | | |
|---|---|---|
| 9,347,389 B2 | 5/2016 | Kawaguchi et al. |
| 9,415,953 B2 | 8/2016 | Bonefas |
| 9,803,324 B2 | 10/2017 | Kean et al. |
| 9,815,479 B2 | 11/2017 | Stander et al. |
| 9,908,385 B2 | 3/2018 | Chundrlik, Jr. et al. |
| 10,479,354 B2 | 11/2019 | Posselius et al. |
| 10,662,613 B2 | 5/2020 | Ready-Campbell et al. |
| 10,968,602 B2 | 4/2021 | Hendricks |
| 2013/0008061 A1* | 1/2013 | Melrose ................ E02F 3/658 37/431 |
| 2016/0003171 A1* | 1/2016 | Ge ........................ E02F 9/267 701/102 |
| 2018/0035050 A1 | 2/2018 | Lu et al. |
| 2018/0179723 A1 | 6/2018 | Olabarrieta et al. |
| 2020/0042023 A1 | 2/2020 | Garvin et al. |
| 2020/0238881 A1 | 7/2020 | Hendricks |
| 2020/0256039 A1* | 8/2020 | Arshad ................ E02F 3/968 |
| 2022/0098828 A1 | 3/2022 | Stander |
| 2024/0093464 A1* | 3/2024 | Sadilek ................ E02F 9/265 |
| 2024/0117598 A1* | 4/2024 | Kotlaba ................ E02F 9/264 |

\* cited by examiner

WORK CYCLE IDENTIFICATION FOR SCRAPERS AND CORRESPONDING FEATURE AUTOMATION

FIELD OF THE DISCLOSURE

The present disclosure relates generally to scrapers that are integrated with or otherwise driven (i.e., drawn or pushed) by a work vehicle to define a self-propelled work unit, and more particularly to systems and methods for detecting a current work state or transitions in work state for a work cycle associated with the work unit and optionally automating one or more functions thereof relating to the work state.

BACKGROUND

Work units as discussed herein may typically include a scraper system (e.g., including a blade for dislodging material to be moved and a receptacle for transportation of the dislodged material) in combination with a tractor, articulated dump truck, or the like, such that the scraper (or equivalent implement) is functionally integrated with a work vehicle, or coupled to and drawn or pushed by a work vehicle, and thereby define a self-propelled work unit. However, the scope of the present disclosure may include or otherwise refer to other machines and equipment, self-propelled or otherwise, which fill a loading container thereof with material worked from the ground and further carry the loaded material from a first location to a second location for discharging/unloading there from.

For conventional work units including such systems such as scraper systems, regardless of the mode of operation (e.g., manual, automatic, semi-automatic), methods of use typically include spending a preset amount of time in a cut (during a loading stage of the work cycle) cut and/or only pulling out of the cut when material begins to spill over the sides of the loading container. Accordingly, it would be desirable to at least provide a more refined approach to operating the work unit during the loading portions of a work cycle.

In addition, it may be desirable to further refine or even automate certain operations during other portions of the work cycle, such that for example transport settings may be optimized for increased productivity, cost savings, or other efficiency metrics.

BRIEF SUMMARY

In order to automate the work cycle of a work unit as discussed herein (e.g., a scraper integrated with or coupled to a tractor, ADT, or the like) an associated control system must be able to sense and determine a current portion (e.g., work state) of the work cycle. Different types of work units have different amounts of sensors available to them, wherein different logic is needed depending on the sensor information available on the system.

The current disclosure provides an enhancement to conventional systems, at least in part by introducing a novel system and method for detecting the current work state, or transitions between work states, in the work cycle based at least in part on recognition of the current sensor suite, and further in some embodiments implementing the detected work state for automation, facilitation of remote operation, or other forms of controlled intervention in operation of the work unit.

In one embodiment, a method is disclosed herein for work cycle tracking for a work unit comprising a self-propelled work vehicle having a loading container for receiving material worked by an implement further associated with the work vehicle. The method includes, for each of a plurality of work states associated with the work cycle, storing correlations between one or more operating parameters of the work vehicle and/or implement and a start or completion of the respective work state. A current work state of the plurality of work states associated with the work cycle is determined based on current input data from a first set of sensors associated with operating parameters of the work vehicle and a second set of sensors associated with operating parameters of the implement, with respect to the stored correlations, and one or more output signals are generated via a controller associated with the work unit based on the determined work state.

An exemplary but non-limiting list of possible work states associated with the work unit may include a loading (workload) state, a first transporting (transport-loaded) state, an unloading (work-unload) state, a second transporting (transport-empty) state, and an idle state.

An exemplary but non-limiting list of possible sensors in the first set of sensors associated with operating parameters of the work vehicle may include one or more sensors configured to generate output signals representing a wheel speed, wheel slip, engine load, draft load, and/or position (e.g., location, elevation), such as may be determined using a global positioning system (GPS) transceiver.

An exemplary but non-limiting list of possible sensors in the second set of sensors associated with operating parameters of the implement (e.g., comprising a scraper, loading container, and associated components for loading and unloading thereof) may include one or more sensors configured to generate output signals representing an absolute blade height (e.g., using GPS), a relative blade height (e.g., using hydraulic cylinder-mounted sensors or an equivalent), a fill level (e.g., using a stereo camera, profile scanner, or the like), etc.

In one exemplary aspect according to the above-referenced embodiment, at least one of the stored correlations for at least one of the work states may relate to a respective threshold value for an operating parameter of the work vehicle or implement.

In another exemplary aspect according to the above-referenced embodiment, traverse of the respective threshold value may indicate a transition from a current work state to a subsequent work state in the work cycle.

The threshold value may for example be dynamic and selectively specifiable via user input.

In another exemplary aspect according to the above-referenced embodiment, the step of storing correlations may include generating data sets for a plurality of prior work cycles based on respective historical input data from the first and second sets of sensors, and developing correlations between the generated data sets and identified work states. The current work state may be determined by a comparison of a data set based on the current input data to corresponding data sets, and retrieving the corresponding work state.

In another exemplary aspect according to the above-referenced embodiment, at least one of the stored correlations for at least one of the work states may relate to a target location of the work vehicle or implement.

In another exemplary aspect according to the above-referenced embodiment, arrival of the work vehicle or implement at the target location may indicate a transition from a current work state to a subsequent work state in the work cycle.

In another exemplary aspect according to the above-referenced embodiment, the target location may be dynamic and selectively specifiable via user input.

In another exemplary aspect according to the above-referenced embodiment, the method may include identifying the first set of sensors associated with operating parameters of the work vehicle and the second set of sensors associated with operating parameters of the implement, and further identifying the stored correlations for the work unit based at least in part on an identified sensor configuration.

In another exemplary aspect according to the above-referenced embodiment, the controller may be responsive to the output signals to tag and aggregate input data from the first and second sets of sensors in association with a corresponding work state and a corresponding work cycle.

In another exemplary aspect according to the above-referenced embodiment, the controller may be responsive to the output signals to automatically perform one or more operations of the work vehicle and/or implement in association with a determined work state.

For example, the implement may include at least a first set of one or more controllable elements for loading material in the loading container during a first work state of the work cycle and a second set of one or more controllable elements for unloading material from the loading container during a second work state of the work cycle, and the controller may generate control signals for automated actuation of the first set of one or more controllable elements or the second set of one or more controllable elements during the respective work states.

In another exemplary aspect according to the above-referenced embodiment, the control signals for automated actuation may be generated to further control a loading rate or unloading rate during the respective work states, based at least in part on one or more predetermined work cycle target values.

In another exemplary aspect according to the above-referenced embodiment, the controller may generate control signals for setting first travel operation settings of the work vehicle during a work state after the first work state, wherein the loading container is loaded, and generates control signals for setting second travel operation settings of the work vehicle during a work state after the second work state, wherein the loading container is unloaded.

In another embodiment, a system as disclosed herein includes a work unit comprising a self-propelled work vehicle having a loading container for receiving material worked by an implement further associated with the work vehicle, a first set of sensors to generate data corresponding to operating parameters of the work vehicle, a second set of sensors to generate data corresponding to operating parameters of the implement, a data storage storing, for each of a plurality of work states associated with the work cycle, correlations between one or more operating parameters of the work vehicle and/or implement and a start or completion of the respective work state, and a controller configured to direct the performance of a method according to the above-referenced embodiment and optionally any one or more of the exemplary aspects.

In an exemplary aspect according to the above-referenced system embodiment, the implement may comprise a scraper integrated with the work vehicle.

In an alternative exemplary aspect according to the above-referenced system embodiment, the implement may include a scraper coupled to and drawn or pushed by the work vehicle.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-4, various embodiments may now be described of a system and method for detecting transitions between work states in a work cycle, and optionally for automating associated features of a work unit.

Figure 1:
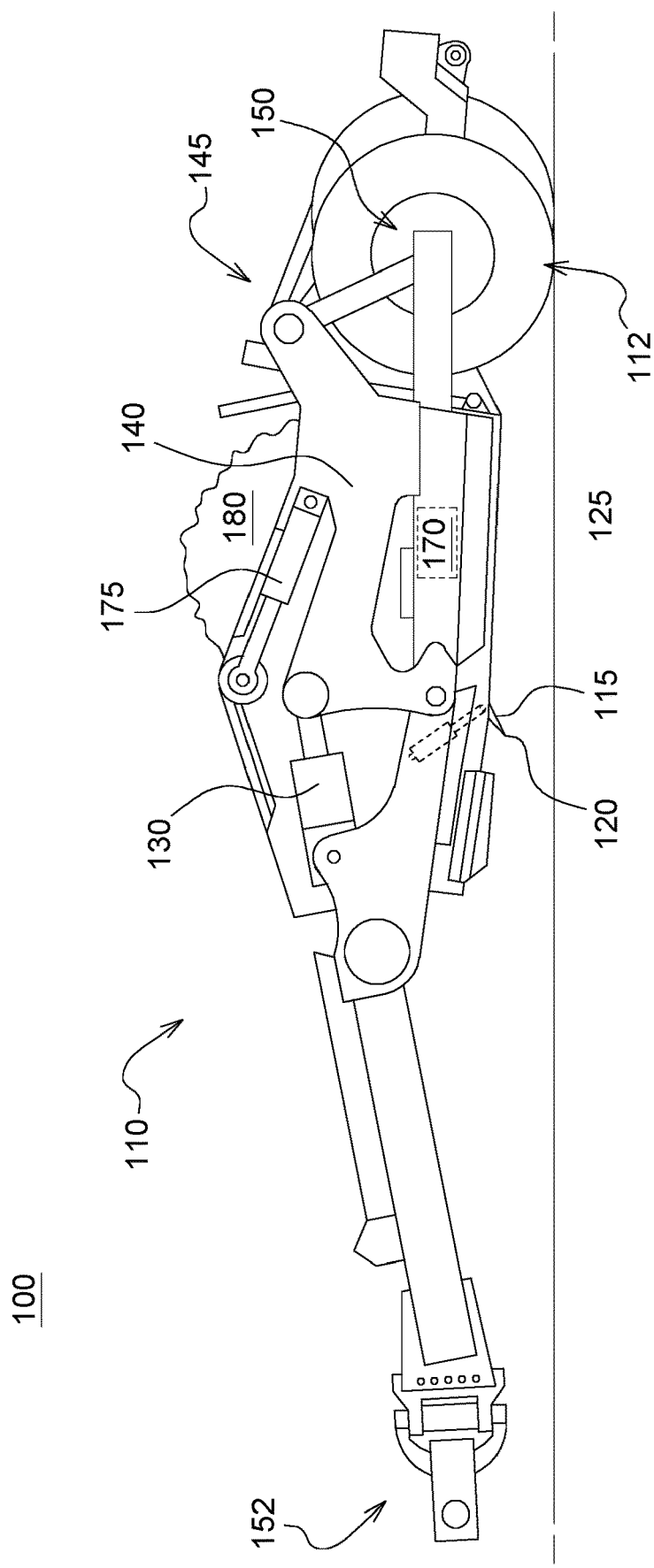
FIG. 1 is a side view representing a scraper as an exemplary implement in a work unit according to the present disclosure.

In an embodiment as disclosed herein, and illustrated by reference to FIG. 1, a work unit 100 includes an implement 110 in the form of a scraper 110 which may be coupled to a self-propelled work vehicle, such as a tractor (not shown) for towing. In other embodiments, the work vehicle may be an articulated dump truck, and/or the implement 110 may be integrated with the work vehicle as opposed to being drawn or pushed thereby, in a manner familiar to those of skill in the art. While the implement 110 as further described below with reference to FIG. 1 will be referenced generally as a scraper 110, other forms of implements may nonetheless fall within the scope of the present disclosure unless otherwise specifically noted.

The scraper 110 is adapted to cut (i.e., remove a portion of a ground surface), load, transport, and unload material to another location. A ground-engaging mechanism 112 as shown comprises a pair of wheels and optionally can have more than two wheels. However, it is contemplated that the implement 110 may be propelled or supported by way of wheels, continuous tracks, and/or belts, depending on the embodiment desired. The implement 110 may include a blade 115 having a cutting edge 120 for scraping a ground surface 125 and a blade actuator 130 for adjusting engagement of the blade 115 with the ground surface 125. The implement 110 may include a loading container 140 or equivalent receptacle operatively coupled to the blade 115 with the loading container towed across the ground surface 125 as the ground surface is cut. The loading container 140 may be embodied as a generally hollow enclosure having an opening at a front end. A blade 115 may be located at front end and positioned to selectively engage the ground surface 125 for material removal.

The implement 110 may include multiple components that interact to power and control operations of the loading container 140 and of the blade 115. Specifically, the implement 110 may include a frame 145, a rear axle assembly 150, and an articulating hitch assembly 152. The frame 145 may be coupled to the rear axle assembly 150 and configured to support the loading container 140. The articulating hitch assembly 152 may couple the frame 145 to a tractor, for example, towing the implement 110 while allowing some relative movement in both the vertical and horizontal directions.

The loading container 140 may be coupled to and supported by a rear axle assembly 150. During extension and retraction of loading container actuators 175, also sometimes referred to as gate actuators, the loading container 140 may be caused to pivot in the vertical direction about a rear axle assembly 150 such that a lead or front end of the loading container may be raised and lowered relative to the ground surface 125. In some embodiments, a power source 170 may be contained near the loading container 140 and supported by rear axle assembly 150. The power source 170 may be operated to drive rear axle assembly 150 and thereby push or at least assist in advancing the implement 110 across the ground surface 125.

In an embodiment (not shown), an implement 110 may be provided with an ejection system which can selectively eject the payload substantially laterally from the loading container 140 onto the ground surface ahead of the work unit 100. The ejection system may be positioned toward the rear of an ejector body, and includes an ejector, which may also be referred to as a headboard, and an actuator. The ejection system operates by having the actuator move the ejector forward to force material 180 out the front end of the loading container 140. The ejector may be supported, aligned, and oriented during this motion by a retention assembly within the loading container 140. The retention assembly may be, for example, a set of guides which receive protrusions from the ejector, and the cooperation of the ejector with these guides may keep the ejector properly aligned and oriented during its movement in the loading container 140. Such an actuator may be a double-acting telescoping hydraulic cylinder, or in alternative embodiments may include a non-telescoping hydraulic cylinder, a hydraulic motor, a screw or worm gear, chains, cables, or an electric motor or actuator, either alone or in combination with each other. In accordance with an embodiment of a material unloading control unit 204, the actuator may be controlled by the flow of hydraulic fluid from an electro-hydraulic valve which receives pressurized hydraulic fluid from a hydraulic pump, which is rotationally coupled to, and powered by, an engine via a transmission. Alternatively, the hydraulic pump may be directly powered by the engine without an intermediate transmission. The engine is disposed on the front frame and powers the work unit 100, including providing tractive effort delivered through transmission and ground-engaging wheels.

Figure 2:
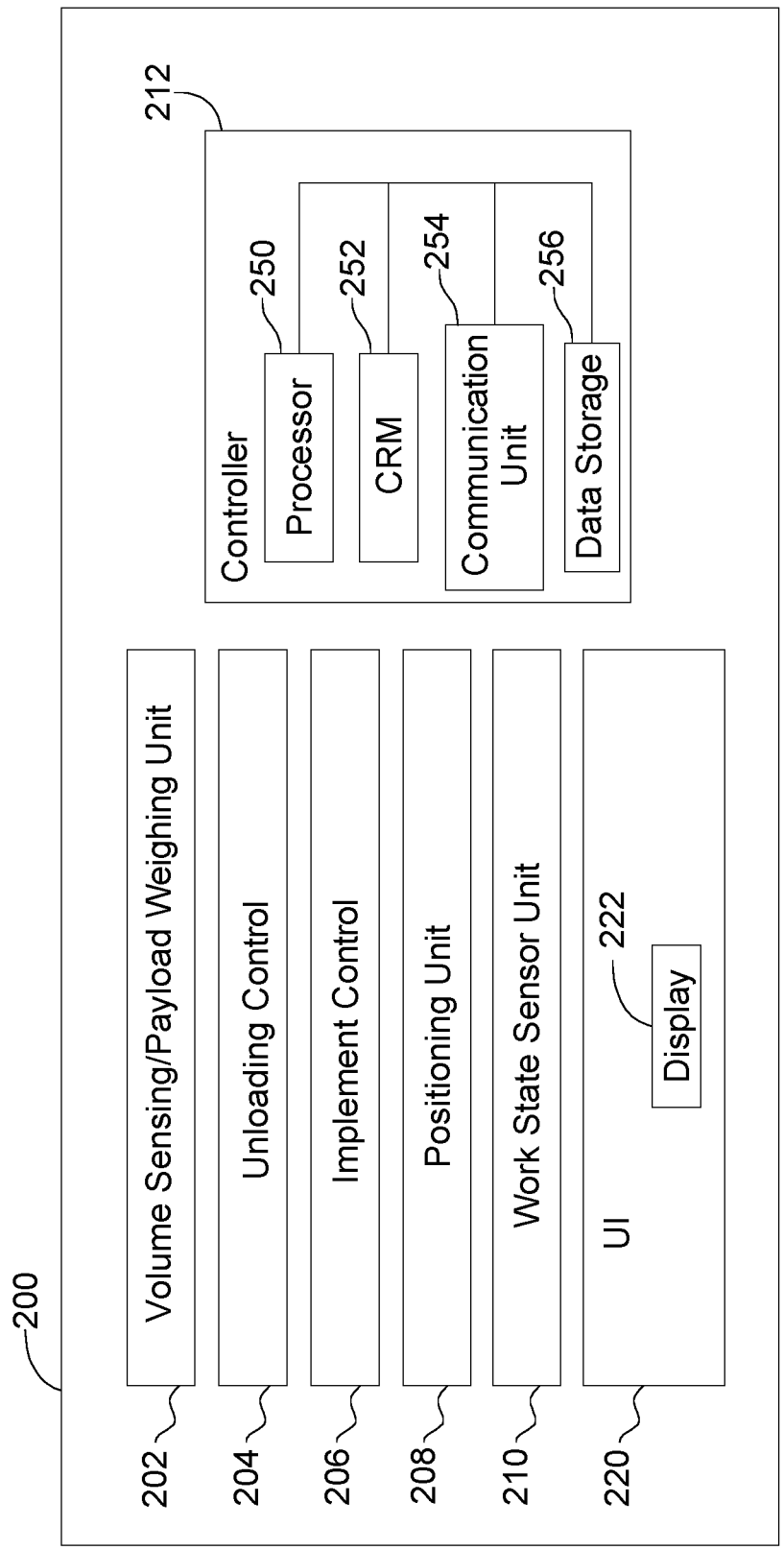
FIG. 2 is a block diagram representing a control system for the work unit according to an embodiment of the present disclosure.

Further by reference to FIG. 2, an exemplary control system 200 for the work unit 100 may include a single controller 212 or discrete controllers for each of the implement 110 and the work vehicle. The work vehicle of the work unit 100, whether drawing or otherwise integrating the implement 110, may include an operator cab (not shown) within which are disposed one or more interface devices 220 located proximal to an operator seat and configured to generate control signals and/or present displays (via display unit 222) associated with operation of the work unit 100. In one example, the interface device 220 may be used to receive user inputs regarding and further generally, or selectively, display information regarding operation of the work vehicle and/or the implement 110.

For example, an advance speed of the work unit 100 may be displayed on the display unit 222 associated with a user interface 220, along with other information such as the gear of the transmission, the weight of the material 180 (payload) being hauled by the work unit 100 and within the loading container 140, the state of loading container actuators 175 or other components such as the ejector body or the ejector (e.g., fully retracted, extending, fully extended, retracting) as indicated by signals from an unloading control unit 204 and/or a work state sensor unit 210. The display unit 222 may also be interactive and enable an operator of the work unit 100 to edit settings or parameters associated with the work unit through buttons, a touchscreen, or peripherals in communication with the user interface 220.

The display unit 222 may also display a current position of the work unit 100, past or planned routes for the work unit 100, and/or a target profile for the ground surface 125. A target profile may for example be provided by a site planning or work planning file or program which indicates a target topography of the area in which the work unit 100 is operating. As a simple example, it may display a large level topography for a site where a building foundation is to be poured, even though the current topography of the site is hilly or otherwise uneven. As another example, it may display a complex topography for a site which includes roads, hills, slopes, ditches, and other three-dimensional features.

The operator may control the work unit 100 through a combination of user interface 220 tools located inside the operator station, such as throttle and brake pedals and a lever which may be actuated to control components of the implement 110 such as via the unloading control unit 204 and/or an implement control unit 206, wherein for example (in the context of an ejector system) an actuation position of the lever may control the speed at which the ejector moves. Actuation of the lever in a first direction may cause the ejector to move rearwards and unload material 180 from the loading container 140, while actuation of the lever in a second direction may cause the ejector to move forwards and prepare the loading container 140 to receive another load of material 180.

The unloading control unit 204 and/or implement control unit 206 may also enable operator control of the unloading of material 180 from the loading container 140 through a switch such as a button positioned on the lever, a detent of the lever, or an alternative user input elsewhere in the operator station. When the operator actuates the switch, it may activate an automated or semi-automated ejection mode for the work unit 100 in which the ejector unloads the material 180 in the loading container 140. Optionally, this automated ejection mode may include returning the ejector to its forward position at the end of the cycle so the work unit 100 is prepared to accept another load of material 180 in the loading container 140.

The control system 200 may include a volume sensing and/or payload weighing unit 202, for example coupled to the loading container 140 of the implement 110. The payload weighing unit 202 may generate payload data or equivalent output signals based on a payload in the loading container 140. The payload data may for example be derived from a volume sensor, which may for example be included in a work state sensor unit 210. The volume sensor may identify one or more of a volume and a fill level of the payload in the loading container 140 of the implement 110.

Exemplary volume sensors in a volume sensing unit 202 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as time-of-flight volumetric sensors within the scope of the present disclosure.

The position and size of an image region recorded by, e.g., a respective camera as a volume sensor in a volume sensing unit 202 may depend on the arrangement and orientation of the camera and the camera lens system, in particular the focal length of the lens of the camera, but may desirably be configured to capture substantially the entire loading container 140 throughout a loading operation. One of skill in the art may further appreciate that image data processing functions may be performed discretely at a given image data source if properly configured, but also or otherwise may generally include at least some image data processing by the controller 212 or other downstream data processor. For example, conventional image and/or time-of-flight imaging data from any one or more image data sources may be provided for three-dimensional point cloud generation, image segmentation, object delineation and classification, and the like, using data processing tools as are known in the art in combination with the objectives disclosed.

The payload data received may indicate if a maximum fill level is achieved. Alternatively, or in addition, the payload data may be derived from a weight sensor (i.e., indirectly monitoring the payload). The weight sensor may for example identify one or more of weight or pressure of the payload in the loading container 140 of the implement 110. For example, in one embodiment of a weight sensor, loading container actuators 175 to tip the loading container 140 for dumping may be equipped with pressure sensors configured to sense hydraulic pressures of fluid within one or more different chambers of the loading container actuators 175 (e.g., a pressure sensor disposed within or otherwise fluidly connected to each pressure chamber of the loading container actuators) and to generate corresponding signals. The signal generated by such pressure sensors may be indicative of forces acting on the loading container 140. That is, the forces generated by weight of material from the payload captured within the loading container 140 may create a signal directed to the controller 212.

A positioning unit 208 may also be provided on the work unit 100. In an embodiment, the positioning unit 208 includes a GNSS receiver system which determines its position and communicates that position to controllers or monitors throughout the work unit 100. In other embodiments, the method or type of positioning system utilized may vary, and may include positioning systems utilizing one or more of satellite, cellular, or local positioning signals, or inertial sensors, and these systems may directly determine position or communicate with another system which determines position.

Generally speaking, the controller 212 may be in communication with any or all of the electro-hydraulic valve, engine, transmission, user interface 220, payload weighing (or measuring) unit 202, material unloading control unit 204, implement control unit 206, positioning unit 208, work state sensor unit 210, and display unit 222, along with various other sensors and tools as may otherwise be described herein but not shown in the figures. The controller 212 may for example receive signals indicative of parameters of the engine, such as those relating to rotational speed (speed), torque, and power, and may control certain aspects of the operation of the engine, such as rotational speed, torque, and power. The controller 212 may communicate with the engine through intermediate components, such as an engine control unit (ECU), and thus may control the engine indirectly by sending commands to the ECU, which in turn controls the engine. Similarly, the controller 212 may receive signals indicative of rotational speed, gear or speed ratio, torque, and power of the transmission, and may control those some aspects of the operation of the transmission, including through an intermediate component such as a transmission control unit (TCU). While the controller 212 is described above as communicating with the various units such as for example the material unloading control unit 204, in various embodiments such units as the material unloading control unit 204 and the controller 212 may be integrated into a common control unit while providing substantially the same end functionality.

The controller 212 may also communicate with another controller located on the work unit 100 or through a cellular or satellite communication unit 254 to a controller located remotely, such as a server or a device operated by a remote owner, operator, or fleet manager. Communication with such controllers may be utilized to set certain parameters of the controller 212, or for the controller 212 to report out parameters of the operation of the work unit 100, such as the payloads hauled, the route taken, the areas which received unloaded material, etc.

The controller 212 further includes or may be associated with a processor 250, a computer readable medium 252, and data storage 256 such as for example a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communication unit 254 may support or provide communications between the controller 212 and external communications units, systems, or devices, and/or support or provide communication interface with respect to internal components of the work unit 100. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

Figure 3:
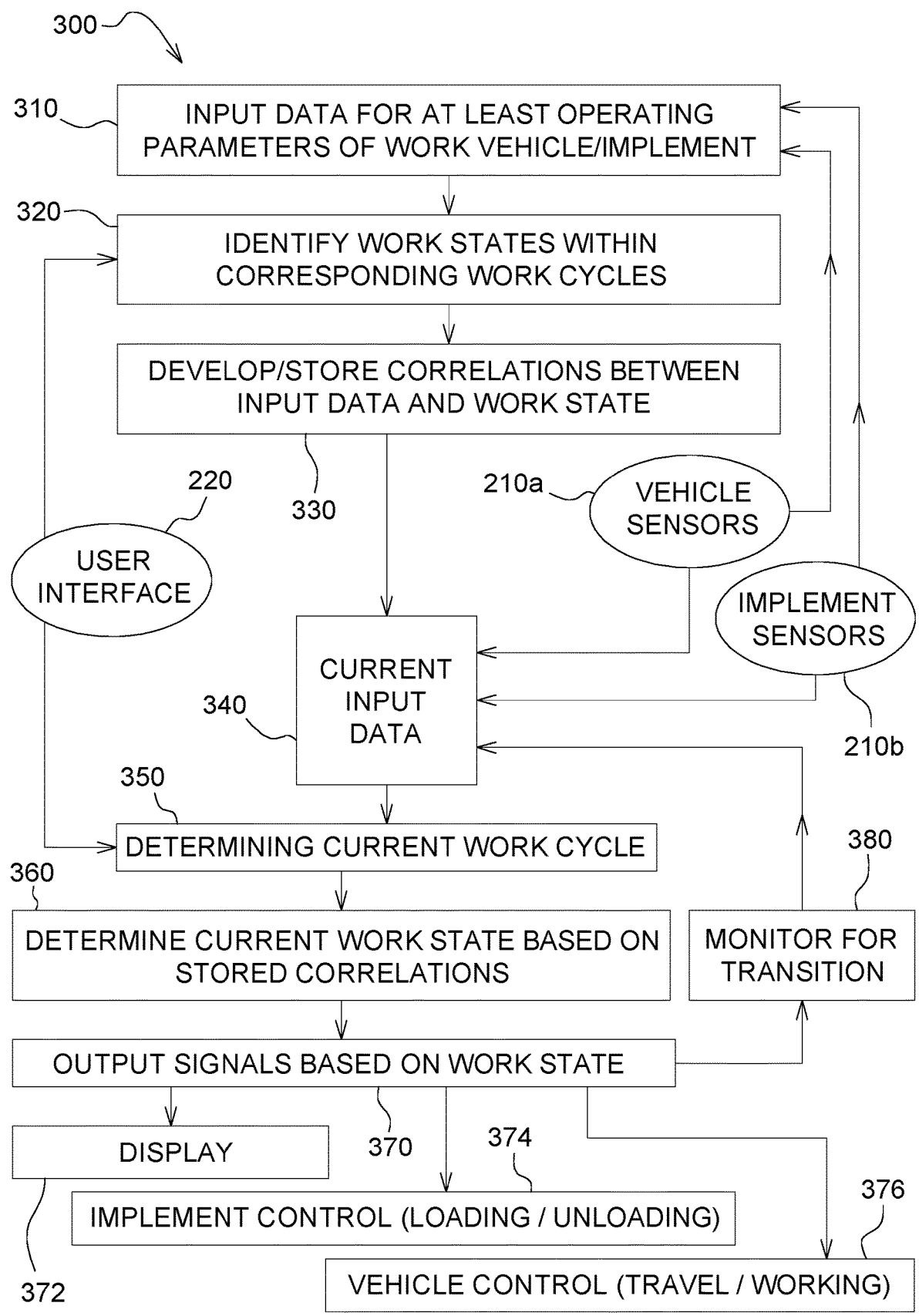
FIG. 3 is a flowchart representing an exemplary method according to an embodiment of the present disclosure.

Referring next to FIG. 3, with further illustrative reference back to FIGS. 1 and 2, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers or machine control systems, remote servers, mobile user devices, and the like.

The method 300 may include a work state model development stage, which in an embodiment begins in step 310 with the collection or otherwise obtaining of input data for operating parameters associated with the work unit 100, e.g., the work vehicle and/or implement 110, and/or additional work units 100 of similar type. An exemplary but non-limiting list of possible sensors 210a associated with the work vehicle may include one or more sensors 210a configured to generate output signals representing a wheel speed, wheel slip, engine load, draft load, and/or position (e.g., location, elevation), such as may be determined using a global positioning system (GPS) transceiver. An exemplary but non-limiting list of possible sensors 210b in the associated with the implement (e.g., comprising a scraper, loading container, and associated components for loading and unloading thereof) may include one or more sensors 210b configured to generate output signals representing an absolute blade height (e.g., using GPS), a relative blade height (e.g., using hydraulic cylinder-mounted sensors or an equivalent), a fill level (e.g., using a stereo camera, profile scanner, or the like), etc.

The method 200 may continue in step 320 with identifying respective work states within a work cycle corresponding to the work unit, based at least in part on the input data for the operating parameters. In an embodiment, a work cycle and associated parameters may be manually defined or otherwise identified via the user interface 220 or another administrative interface. Each individual work state corresponding to the defined work cycle may for example have one or more aspects by which the respective work state is automatically identifiable.

In an embodiment, some or all of such aspects may be predetermined. In some embodiments, at least some of such aspects are determined using a work state model which is developed over time (step 330). Such a model may be developed based on input data sets from the above-referenced work unit sensors 210a, 210b, further as correlated with defined work states for the work cycle at issue. The correlations may include user input during the training stage, to provide or otherwise confirm a work state as corresponding to the input data sets.

In an embodiment, development of a work state model may encompass the classifying of sequences of data recorded by sensors 210a, 210b into defined machine states, which may for example relate to a particular type of work unit 100, work cycle, or the like. Work state estimation may be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the work unit 100. The LSTM models may accordingly be trained on time series data and observe loss and accuracy values over N training iterations, wherein losses are decreased and accuracy increased over time. The model may be described as classifying these time series data into defined work states.

For generation of the wear state model, time series data may for example be streamed from the respective sensors/data sources 210a, 210b on a work unit 100 (or a plurality of analogous work units) via a communications network onto a cloud server network, wherein the model is developed (i.e., trained and validated) at the cloud server level. Once the model has been sufficiently validated, it may be transmitted, for example via the communications network, and deployed by the controller 212 onboard a work unit 100 for subsequent work state estimation as described below. The cloud server network may however continue to receive input time series data from the work unit 100 (or plurality of analogous work units) for the purpose of further refining the model, wherein updated versions of the model may be transmitted to the work unit 100 periodically or on demand.

With work state models having been developed and selectively retrievable by the controller 212 for a new iteration of a working operation by the work unit 100, the method 300 may continue with a step 340 of receiving input data for current operating parameters associated with the work unit 100, e.g., the work vehicle and/or implement 110 from sensors 210a, 210b, and optionally input data from the user interface 220. The method 300 may further include a determination of the current work cycle (step 350) for the work unit, which may for example be provided via the user interface 220 upon initiation of a new work cycle. As previously noted, identification of a work cycle may be provided to identify the corresponding work states to be monitored.

In an embodiment, the control system 200 may identify a number of sensors 210a, 210b which are present and active in association with the work unit 100, and detect or otherwise identify a work cycle for a current working operation and/or a sequence of work states associated with the work cycle based on the sensor configuration, values received from one or more of the sensors 210a, 210b, and the like. For example, in some contexts a work cycle may include four work states as described below with respect to FIG. 4, whereas in other contexts a work cycle that is otherwise equivalent may include six work states such as idle states to account for periods of time in which the work unit 100 requires maintenance, must wait for other work units in the area to complete a respective working operation, and the like. The control system 200 in an embodiment may identify a first set of sensors 210a and a second set of sensors 210b, and further select an appropriate model or otherwise identify the stored correlations best suited to the present operation based at least in part on an identified sensor configuration.

In some embodiments, work cycle parameters may further include a number of work units 100 assigned to a particular work area, a target profile of the work area, an amount of time allocated for working of the work area, a desired unloading/dumping area which may be associated with the work area or a different area, a type of material (substrate) 180 being worked in the work area and transported there from, etc.

The method 300 may then continue by automatically determining a current work state in step 360 within the identified work cycle (and/or automatically determining transitions in step 380 between work states), for example based on the stored correlations between the input data sets and the various work states by selective retrieval and implementation of the work state models.

As further described below, in some embodiments a work state transition from a given work state may be defined with respect to the traverse of threshold values for one or more respective parameters. For example, a work state transition may be triggered when the loading container 140 of the work unit 100 is loaded above and/or unloaded below a threshold amount. Such thresholds may be predetermined based for example on a configuration of the loading container 140, or may be dynamic in nature, such as for example specified by user input via the user interface 220 to the control system 200 even during a working operation. In an embodiment, such thresholds may themselves be dynamically determined by the control system 200 as values that are learned over a number of work cycles as best corresponding to respective work states or transitions between certain work states. For example, the control system 200 may recognize in the context of a particular working operation that a certain fill level best corresponds with a point at which the operator stops the cutting mode and transitions to a traveling mode, and apply that fill level as a threshold value when work state transitions are automatically to be detected and implemented.

In addition, or in the alternative, a work state transition may be triggered when a particular operation is identified based on one or more monitored parameters or rates of change thereof. As one example, a positive volumetric flow rate of material into the loading container 140 may be indicative of a loading work state, whereas a negative volumetric flow rate of material into the loading container 140 may be indicative of an unloading work state, either of which may for example be independent of any specific thresholds.

Also as further described below, and as a possible supplement or alternative to the preceding embodiment, a work state transition may be triggered when the work unit 100 crosses a geographic boundary or otherwise enters a particular location, based for example on a spatial knowledge of the work area and corresponding cut and/or fill zones associated therewith. Such thresholds may also be predetermined or dynamic in nature, such as for example as specified by user input via the user interface 220 to the control system 200, and/or dynamically determined by the control system 200 as values that are learned over a number of work cycles as best corresponding to respective work states or transitions between certain work states. For example, the control system 200 may recognize in the context of a particular working operation that an unloading mode corresponds to a first location (or proximity thereof) for the work unit 100 and that a loading (e.g., cutting) mode corresponds to a second location (or proximity thereof) for the work unit 100.

In an embodiment, two or more of the preceding examples may be utilized in tandem, for example to use a detected volumetric flow rate of material to provide confirmation of a work state transition that is preliminarily triggered with the system based on a detected location of the work vehicle.

Output signals may be generated in step 370 based on the detected current work state, which may in various embodiments be generated to the user interface 220 for display on the associated display unit 222 (step 372), and/or utilized for automatic control of one or more components of the implement 110 (step 374), and/or utilized for automatic control of one or more components of the work vehicle such as for example based on a travelling mode or a working mode for the work unit 100 (step 376).

The output signals in an embodiment may further be provided as feedback signals for development and/or confirmation of the work state models, wherein the control system 200 may be responsive to the output signals to tag and aggregate input data from the various sensors 210a, 210b in association with a corresponding work state and a corresponding work cycle.

Figure 4:
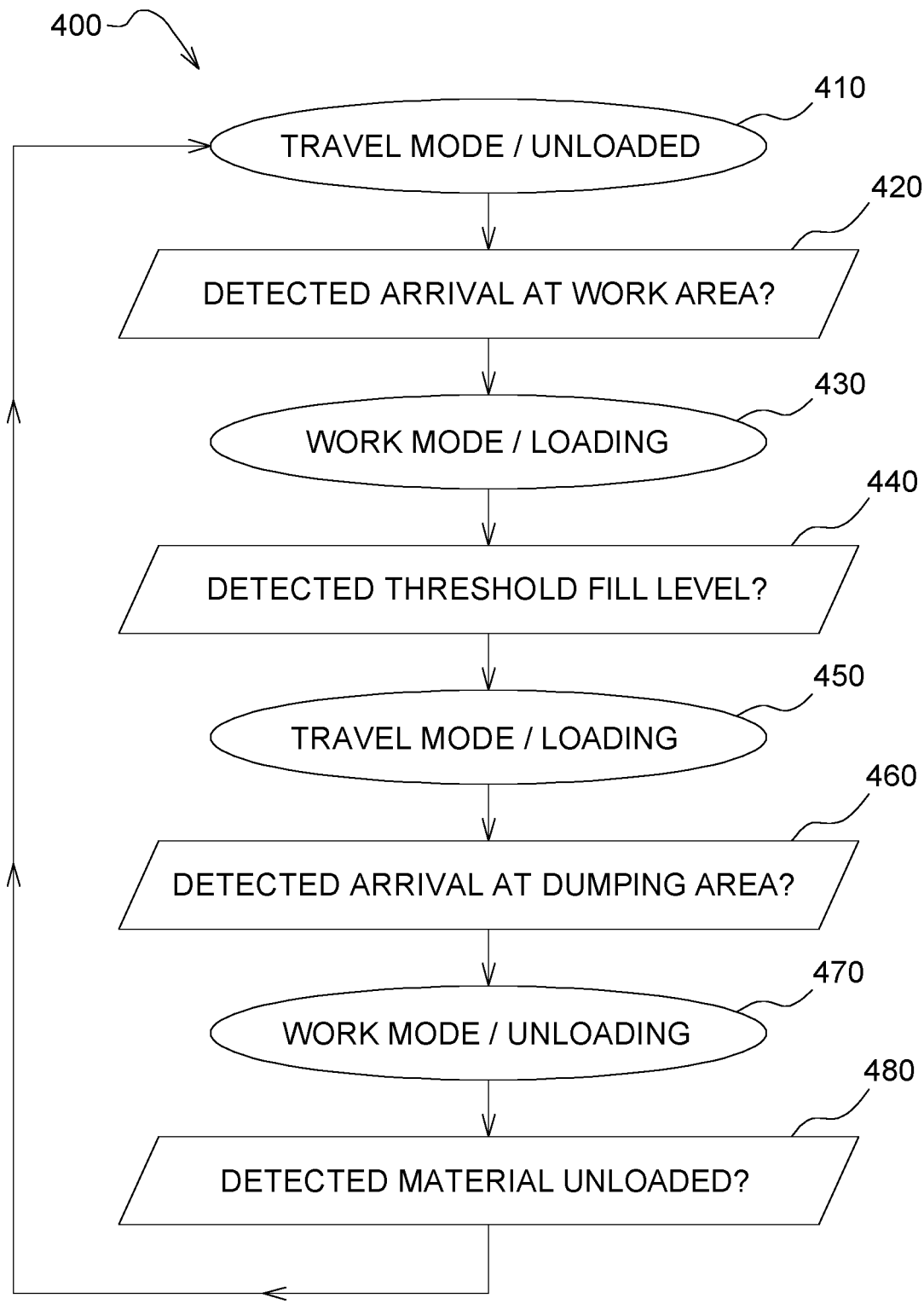
FIG. 4 is a flowchart representing an exemplary work cycle and corresponding work states according to an embodiment of the present disclosure.

Referring to FIG. 4, an exemplary work cycle 400 and associated workflow for ascertaining work states may be described for illustration, but without limitation on the scope of the present disclosure unless otherwise specifically noted.

An initial work state 410, which is of course only first for illustrative purposes, includes a travel mode for the work unit 100, and more particularly for the work vehicle or work vehicle portion of the work unit, further wherein the implement 110 of the work unit 100 is unloaded. In such an event, the controller 212 may for example be configured to set one or more target parameters such as a transmission gear and/or advance speed of the work unit for a smooth ride when transporting an empty loading container 140 as opposed to the situation where the implement 110 is fully loaded. The controller 212 may further, in view of target loading areas associated with the work cycle and/or a number of other work units 100 assigned to the same work area generally, automate or otherwise regulate one or more aspects of work unit travel so as to arrive at the next loading area at an appropriate time.

Upon determining (step 420) that the work unit 100 has arrived at the work area, or in various embodiments at a designated portion of the work area, based on any relevant combination of input data from sensors 210a, 210b, such as for example GPS-determined locations and in some cases further or alternatively from the user interface 220, the controller 212 may note a transition from the first work state 410 to a second work state 430 including a work-loading (cutting) mode. In this second work state 430, the implement 110 and more particularly the blade 115 and the cutting edge 120 thereof may be actuated to engage the ground surface 125 and cause loading of the material 180 into the loading container 140, while an advance speed and other operations of the work vehicle are controlled appropriately and in accordance with the loading operation.

As previously discussed, the transition determined in step 420 from the first work state 410 to the second work state 430 may be based on a detected change in volumetric flow rate associated with the loading operation, or more proactively based on a detected location of the work vehicle relative to a specified loading (cutting) zone in the work area, or various additional or alternative examples as may be apparent to one of skill in the art.

The volume sensing and/or payload weighing unit 202 may be utilized (step 440) to determine a transition from the second work state 430, such as for example when the scraper fill level is determined to be above a certain threshold. The threshold may be static and fully dependent on the parameters of the loading container 140, or may otherwise be variable and at least partially dependent on the above-referenced work cycle parameters, wherein for example one or more work units 100 are assigned to a given work area and the number of work unit loads is optimized in some fashion rather than simply assigning a full load for each work cycle iteration. For example, it may be determined that a particular work unit 100 is capable of carrying a payload of a first size, but that based on an amount of time allocated for a working operation and/or a number of work units 100 assigned to the working operation it is preferred for the work unit 100 to carry a specified payload smaller than the capabilities of the work unit 100 would otherwise permit.

Upon determining a transition from the second work state 430 to a third (e.g., travel-loaded) work state 450, the work unit 100 may next be configured for transport of the loaded material 180 in the loading container 140 to a specified dumping area. The controller 212 may for example be configured to set one or more target parameters such as a transmission gear and/or advance speed of the work unit for a travel mode that is different from the "unloaded" travel mode in view of the loaded material 180.

The controller 212 may further, in view of target dumping areas associated with the work cycle and/or a number of other work units 100 assigned to the same work and/or dumping area generally, automate or otherwise regulate one or more aspects of work unit travel so as to arrive at the next dumping area at an appropriate time or in an appropriate position relative to any other work units 100.

Upon determining (step 460) that the work unit 100 has arrived at the specified or at least an approved dumping area, based on any relevant combination of input data from sensors 210a, 210b, such as for example GPS-determined locations and in some cases further or alternatively from the user interface 220, the controller 212 may note or otherwise execute actions corresponding to a transition from the third work state 450 to a fourth work state 470 including a work-unloading (dumping) mode. In this fourth work state 470, the loading container actuators 175 (or an ejector system as alternatively described above) may be utilized to cause unloading of the material 180 from the loading container 140, while an advance speed and other operations of the work vehicle are controlled appropriately and in accordance with the unloading operation. As previously noted, depending on the configuration of the implement 110 and loading container 140, the loading container 140 may be pivoted upward to cause the material 180 to fall out of the loading container 140, optionally with the assistance of one or more controlled components thereof, or an ejector may be actuated to laterally slide the material 180 outward to the rear of the work unit 100.

As previously discussed, the transition determined in step 460 from the third work state 450 to the fourth work state 470 may be based on a detected change in volumetric flow rate (e.g., negative flow rate) associated with the loading operation, or more proactively based on a detected location of the work vehicle relative to a specified unloading (filling) zone in the work area, or various additional or alternative examples as may be apparent to one of skill in the art.

The controller 212 may further, in view of target unloading rates associated with the work cycle and/or a number of other work units 100 assigned to the same work and/or dumping area generally, automate or otherwise regulate one or more aspects of the unloading control unit 204 so as to increase or decrease the unloading rate as needed or desired.

A process for detecting that the unloading mode is complete, i.e., a transition or trigger for transitioning from the fourth work state, may for example include processing of inputs from sensors in the hydraulic cylinders, ejector system, or other elements of a material unloading control unit 204 respective to the type of work unit 100, processing of inputs from sensors or image data sources capturing a pose of the loading container 140, or the like. In an embodiment, the control system 200 may further be configured to determine one or more characteristics (e.g., an amount and/or location) of "carryback" material 180 still remaining in the loading container 140, either adhering to bottom and/or side surfaces of the loading container 140 or otherwise adhering to elements of the material unloading control unit 204 such as an ejector blade. The implement 110 may for example be considered as "unloaded" if an amount of carryback material is detected below a defined threshold, whereas the control system 200 may otherwise suspend transition from the unloading work state/mode and alert or otherwise initiate an intervention for further removal of material 180 from the loading container 140. Rather than relying on a defined threshold, the system 200 may monitor a trend of carryback material 180 accumulation over time based on a calculated aggregation of data inputs from one unloading iteration to the next. Aggregation trends may be calculated and accordingly utilized to provide non-threshold-based determinations of whether an intervention is required, such as for example by enabling the prediction of future carryback material states.

In an embodiment, an amount of carryback material 180 may be determined using for example a first measurement from a payload weighing unit 202 corresponding to the loading container 140 in a completely empty state and a second measurement from the payload weighing unit 202 corresponding to the loading container 140 after an unloading stage is completed or otherwise upon detecting an unloaded state, wherein a difference between the first and second measurements may be categorized as a weight of the remaining carryback material 180. In another exemplary embodiment, an image data source (e.g., camera, lidar sensor, radar sensor) may be used to scan or otherwise capture data corresponding to a first profile of the loading container 140 in a completely empty state and to scan or otherwise capture data corresponding to a second profile of the loading container 140 after an unloading stage is completed or otherwise upon detecting an unloaded state, wherein a difference between the first and second profiles may be processed to determine a volume of the remaining carryback material. Other embodiments may include a combination of the above-referenced inputs, and/or a combination of inputs from sensors based on the work unit 100 and external to the work unit 100.

Finally, upon determining (step 480) that the previously loaded material 180 has been dumped or otherwise unloaded from the loading container 140 of the implement 110, the controller 212 may note or otherwise execute actions corresponding to a transition from the fourth work state 470 back to the first work state 410, wherein the work unit 100 travels unloaded to the cutting area as previously noted.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of work cycle tracking for a self-propelled work unit comprising a work vehicle and a loading container for receiving material worked by an implement further associated with the work vehicle, the method comprising:
   for each of a plurality of work states associated with the work cycle, storing correlations between one or more operating parameters of the work vehicle and/or implement and performance of operations associated with the respective work state;
   for at least one of the plurality of work states associated with the work cycle, dynamically and automatically determining a respective transition value for each of one or more operating parameters as corresponding to a start or completion of the respective work state;
   determining a transition to a current work state of the plurality of work states associated with the work cycle based on current input data from a first set of sensors associated with operating parameters of the work vehicle and a second set of sensors associated with operating parameters of the implement, with respect to the stored correlations and/or the respective transition value for the current or previous work state; and
   generating one or more output signals via a controller associated with the work unit, to automatically perform one or more operations of the work vehicle and/or implement in association with the determined current work state.

2. The method of claim 1, wherein:
   the step of storing correlations comprises generating data sets for a plurality of prior work cycles based on respective historical input data from the first and second sets of sensors, and developing correlations between the generated data sets and identified work states; and
   the current work state is determined by a comparison of a data set based on the current input data to corresponding data sets, and retrieving the corresponding work state.

3. The method of claim 1, wherein at least one of the stored correlations for at least one of the work states relates to a target location of the work vehicle or implement.

4. The method of claim 3, wherein arrival of the work vehicle or implement at the target location indicates a transition from a current work state to a subsequent work state in the work cycle.

5. The method of claim 3, wherein the target location is dynamic and selectively specifiable via user input.

6. The method of claim 1, comprising identifying the first set of sensors associated with operating parameters of the work vehicle and the second set of sensors associated with operating parameters of the implement, and further identifying the stored correlations for the work unit based at least in part on an identified sensor configuration.

7. The method of claim 1, wherein the controller is responsive to the output signals to tag and aggregate input data from the first and second sets of sensors in association with a corresponding work state and a corresponding work cycle.

8. The method of claim 1, wherein the implement further comprises at least a first set of one or more controllable elements for loading material in the loading container during a first work state of the work cycle and a second set of one or more controllable elements for unloading material from the loading container during a second work state of the work cycle, and wherein the controller generates control signals for automated actuation of the first set of one or more controllable elements or the second set of one or more controllable elements during the respective work states.

9. The method of claim 8, wherein the control signals for automated actuation are generated to further control a loading rate or unloading rate during the respective work states, based at least in part on one or more predetermined work cycle target values.

10. The method of claim 8, wherein the controller generates control signals for setting first travel operation settings of the work vehicle during a work state after the first work state, wherein the loading container is loaded, and generates control signals for setting second travel operation settings of the work vehicle during a work state after the second work state, wherein the loading container is unloaded.

11. The method of claim 1, wherein for the at least one work state of the plurality of work states associated with the work cycle, a respective transition value is dynamically determined over a plurality of work cycles based at least in part on a target profile of a work area relative to a current profile of the work area.

12. The method of claim 11, wherein the respective transition value for the at least one work state is a threshold value for a fill level of the loading container which is dynamically dependent on a number of work units assigned to the work area and/or an amount of time allocated for a working operation.

13. The method of claim 12, wherein the respective transition value for an unloading work state, as another work state of the plurality of work states, is a threshold value for an amount of carryback material remaining in the loading container during the unloading work state, wherein the threshold value for the amount of carryback material remaining is dynamically determined based on a calculated aggregation of data inputs during respective unloading work states across the plurality of work cycles.

14. A system comprising:
   a self-propelled work unit comprising a work vehicle and a loading container for receiving material worked by an implement further associated with the work vehicle, wherein the implement further comprises at least a first set of one or more controllable elements for loading material in the loading container during a first work state of the work cycle and a second set of one or more controllable elements for unloading material from the loading container during a second work state of the work cycle;
   a first set of sensors configured to generate data corresponding to operating parameters of the work vehicle;
   a second set of sensors configured to generate data corresponding to operating parameters of the implement;
   a data storage configured to store, for each of a plurality of work states associated with the work cycle, correlations between one or more operating parameters of the work vehicle and/or implement and performance of operations associated with the respective work state; and
   a controller configured to
      for at least one of the plurality of work states associated with the work cycle, dynamically and automatically determining a respective transition value for each of one or more operating parameters as corresponding to a start or completion of the respective work state;

determine a transition to a current work state of the plurality of work states associated with the work cycle based on current input data from the first set of sensors and the second set of sensors, with respect to the stored correlations and/or the respective transition value for the current or previous work state, and generate control signals for automated actuation of the first set of one or more controllable elements or the second set of one or more controllable elements during the respective work states.

15. The system of claim 14, wherein the implement is integrated with the work vehicle and comprises a scraper blade.

16. The system of claim 14, wherein the implement is coupled to and drawn or pushed by the work vehicle and comprises a scraper blade.

17. The system of claim 14, wherein the controller is configured to:

generate data sets for a plurality of prior work cycles based on respective historical input data from the first and second sets of sensors;

develop correlations between the generated data sets and identified work states, which are further stored in the data storage; and determine the current work state by a comparison of a data set based on the current input data to corresponding data sets, and retrieving the corresponding work state.

18. The system of claim 14, wherein the control signals for automated actuation are generated to further control a loading rate or unloading rate during the respective work states, based at least in part on one or more predetermined work cycle target values.

* * * * *